United States Patent
Coleman et al.

(10) Patent No.: US 8,266,025 B1
(45) Date of Patent: Sep. 11, 2012

(54) SYSTEM AND METHOD FOR ASSURING THE INTEGRITY OF DATA USED TO EVALUATE FINANCIAL RISK OR EXPOSURE

(75) Inventors: Ronald Coleman, Hyde Park, NY (US); Richard Renzetti, Colorado Springs, CO (US)

(73) Assignee: Citibank, N.A., New York, NY (US)

(*) Notice: Subject to any disclaimer, the term of this patent is extended or adjusted under 35 U.S.C. 154(b) by 1873 days.

(21) Appl. No.: 09/634,755

(22) Filed: Aug. 8, 2000

Related U.S. Application Data

(60) Provisional application No. 60/147,487, filed on Aug. 9, 1999.

(51) Int. Cl.
*G06F 17/00* (2006.01)

(52) U.S. Cl. ............. 705/35; 705/500; 702/35; 702/81; 717/135

(58) Field of Classification Search ............... 705/1, 35, 705/500; 702/35, 81; 717/135
See application file for complete search history.

(56) References Cited

U.S. PATENT DOCUMENTS

| | | | |
|---|---|---|---|
| 4,642,782 A | 2/1987 | Kemper et al. | 364/550 |
| 4,649,515 A | 3/1987 | Thompson et al. | 364/900 |
| 4,694,397 A * | 9/1987 | Grant et al. | 705/42 |
| 4,866,634 A * | 9/1989 | Reboh et al. | 706/60 |
| 5,396,612 A * | 3/1995 | Huh et al. | 714/49 |
| 5,557,724 A * | 9/1996 | Sampat et al. | 725/43 |
| 5,577,166 A | 11/1996 | Mizuno | 395/22 |
| 5,613,072 A | 3/1997 | Hammond et al. | 395/204 |
| 5,822,741 A | 10/1998 | Fischthal | 706/16 |
| 5,930,762 A * | 7/1999 | Masch | 705/7 |
| 5,991,743 A | 11/1999 | Irving et al. | 705/36 |
| 6,018,723 A | 1/2000 | Siegel et al. | 705/38 |
| 6,047,067 A * | 4/2000 | Rosen | 705/68 |
| 6,052,689 A * | 4/2000 | Muthukrishnan et al. | 707/101 |
| 6,065,007 A * | 5/2000 | Muthukrishnan et al. | 707/7 |
| 6,185,512 B1 * | 2/2001 | Lambrecht | 702/97 |
| 6,393,447 B1 | 5/2002 | Jakobsson et al. | 708/250 |
| 6,466,929 B1 | 10/2002 | Brown et al. | 706/48 |
| 6,477,471 B1 * | 11/2002 | Hedstrom et al. | 702/34 |

(Continued)

FOREIGN PATENT DOCUMENTS

GB 2 236 922 A 11/1999

(Continued)

OTHER PUBLICATIONS

Statistics Meaning and MethodSecond Edition; Lawernce Laupin 1980.*

(Continued)

*Primary Examiner* — Calvin L Hewitt, II
*Assistant Examiner* — John M Winter
(74) *Attorney, Agent, or Firm* — Eric L. Sophir; SNR Denton US LLP

(57) ABSTRACT

A method and system is provided for assuring the integrity of data used to evaluate financial risk or exposure in trading portfolios such as portfolios of derivative contracts by looking for sweeping changes or statistically significant trends suggestive of possible errors. The method and system uses Content Analysis to measure the changes in the information content or entropy of data to detect abnormal changes that may require human intervention. A graphical user interface can also be provided that provides a mechanism for alerting users of possible errors and also gives an indication of the severity of the detected abnormality.

10 Claims, 10 Drawing Sheets

U.S. PATENT DOCUMENTS

| | | | |
|---|---|---|---|
| 6,510,419 B1 * | 1/2003 | Gatto | 705/36 R |
| 6,523,019 B1 * | 2/2003 | Borthwick | 706/45 |
| 6,920,451 B2 | 7/2005 | Shaw | 707/6 |
| 6,941,287 B1 * | 9/2005 | Vaidyanathan et al. | 706/12 |

FOREIGN PATENT DOCUMENTS

| | | |
|---|---|---|
| JP | 07-114609 | 5/1995 |
| JP | 08-504284 | 5/1996 |
| JP | 08-161573 | 6/1996 |
| JP | 09-297736 | 11/1997 |
| WO | WO 94/06103 | 3/1994 |
| WO | WO 99/01833 | 1/1999 |

OTHER PUBLICATIONS

David Nawrocki "State-value weighted entropy as a measure of investment risk" 1986.*

Billa, J. and El-Jaroudi, A., "A Method of Generating Objective Functions for Probability Estimation," *Engineering Applications of Artificial Intelligence*, vol. 9, No. 2, pp. 205-208, Apr. 1996.

Leonard, J., et al., "Neural Network Architecture that Computes Its Own Reliability," *Computers & Chemical Engineering*, vol. 16, No. 9, pp. 819-835, Sep. 1992.

Bensman, Miriam, "Taking the Measure of Risk: Prodded by Pension Fund Clients, Fund Managers are Adopting Quant Risk Control Methods and Naming Risk Specialists. The Aim: Smarter Risk-Taking," *Institutional Investor*, vol. 30, No. 11, p. 49(7), Nov. 1996.

Coats, Pamela K. and Fant, L. Franklin, "Recognizing Financial Distress Patterns Using a Neural Network Tool," *Neural Networks in Finance and Investing*, pp. 163-192, 1996.

Bonavita, N., et al., "Model-Based Fault Detection and Isolation Techniques: The Parameter Identification Approach Within the Framework of the TOPMUSS CAE-System," *Proceedings of the 1994 Conference on Control Applications*, Part 2 (of 3), p. 1369-1378, 1994.

Swets, John A., "Measuring the Accuracy of Diagnostic Systems," *Science*, vol. 240, p. 1285-93, Jun. 3, 1988.

Goonatilake, Suran, "Intelligent Systems for Finance and Business: An Overview," Chapter 1, *Intelligent Systems for Finance and Business*, John Wiley & Sons, pp. 1-28, 1995.

Cox, Earl, "A Fuzzy System for Detecting Anomalous Behaviors in Healthcare Provider Claims," Chapter 7, *Intelligent Systems for Finance and Business*, John Wiley & Sons, pp. 111-134, 1995.

Mott, Steve, "Insider Dealing Detection at the Toronto Stock Exchange," Chapter 8, *Intelligent Systems for Finance and Business*, John Wiley & Sons, pp. 135-144, 1995.

United Kingdom Search Report on Application No. GB 0019522.2, dated Apr. 11, 2001 (mailing date).

Berenson, Mark L. and Levine, David M., "Business Statistics: A First Course," Prentice-Hall, Inc., pp. 408-410, 1998.

Response to Non-Final Office Action dated Oct. 16, 2008 filed Feb. 13, 2009 for U.S. Appl. No. 10/989,046, 8 pp.

Interview Summary for U.S. Appl. No. 10/989,046, dated Feb. 2, 2009, 2 pp.

Agenda for Interview Regarding U.S. Appl. No. 10/989,046, dated Jan. 13, 2009, 6 pp.

Non-Final Office Action dated Oct. 16, 2008 for U.S. Appl. No. 10/989,046, 17 pp.

Request for Continued Examination filed Sep. 12, 2008 in response to Final Office Action dated Jun. 12, 2008 for U.S. Appl. No. 10/989,046, 12 pp.

Nawrocki, David and Harding, William, "State-Value Weighted Entropy as a Measure of Investment Risk," *Applied Economics*, pp. 411-419, 1986.

Final Office Action, dated Apr. 27, 2009, for U.S. Appl. No. 10/989,046, 13 pp.

Tanaka, Hatsuichi, "Progress of Information Theory and ItsProspect in the $21^{st}$ Century: 50 Years from Shannon," Electronics, Information and Communication Engineers Journal, Information and Communication Engineers, vol. 81, No. 990-993, Oct. 25, 1998.

Final Office Action dated Jun. 12, 2008 for U.S. Appl. No. 10/989,046.

Response to Non-Final Office Action dated Jun. 4, 2007 filed Oct. 4, 2007 for U.S. Appl. No. 10/989,046.

Non-Final Office Action dated Jun. 4, 2007 for U.S. Appl. No. 10/989,046.

Amendment correcting priority claim filed May 22, 2007 for U.S. Appl. No. 10/989,046.

Response to Non-Final Office Action dated Feb. 20, 2007 filed Apr. 3, 2007 for U.S. Appl. No. 10/989,046.

Non-Final Office Action dated Feb. 20, 2007 for U.S. Appl. No. 10/989,046.

The Penguin English Dictionary, Merriam-Webster, Inc. and Longman Group Ltd., 1986, and Penguin Books, 2000, 1 p.

\* cited by examiner $\Omega_d(X, Y)$
1   $N_{min} \leftarrow 2$
2   if $size[X] < N_{min}$ or $size[Y] < N_{min}$
3       then return (0,0)
4   for each key $k \in X$
5       do $D_x[X[k]] \leftarrow D_x[X[k]] + 1$
6   $MaxEntropy \leftarrow size[X] * log(size[D_x])$
7   for each key $k \in Y$
8       do $D_y[Y[k]] \leftarrow D_y[Y[k]] + 1$
9   $Entropy \leftarrow 0$
10  for each key $k$ of $D_y$
11      do $Entropy \leftarrow Entropy - D_y[k] * log(D_y[k]/size[Y])$
12  return($MaxEntropy$, $Entropy$)

*FIG. 2*

$\Omega_c(X, Y)$
1  $N_{min} \leftarrow 4$
2  if $size[X] < N_{min}$
3      then return (0,0)
4  $n_x \leftarrow \lceil \sqrt{size[X]} \rceil$
5  $X_{sort} \leftarrow sort[X]$
6  for $j \leftarrow 1$ to $n_x$
7      do $Bounds[j - 1] \leftarrow X_{sort}[n_x * j - 1]$
8  $MaxEntropy \leftarrow n_x * log(\sqrt{size[X]})$
9  $MaxBounds \leftarrow Bounds[n_x - 1]$
10 for each key $v \in Y$
11     do for each key $k$ of $Bounds$
12         do if $Y[v] < Bounds[k]$
13             then $D_Y[k] \leftarrow D_Y[k] + 1$; next
14         if $Y[v] > MaxBounds$
15             then $D_Y[n_x - 1] \leftarrow D_Y[n_x - 1] + 1$
16             next
17 for each key $k$ of $D_y$
18     do $Entropy \leftarrow Entropy - D_y[k] * log(D_y[k]/size[Y])$
19 return($MaxEntropy, Entropy$)

*FIG. 3*

$\Omega_{cxc}(X, Y)$
1  $N_{min} \leftarrow 16$
2  if $size[X] < N_{min}$
3    then return (0,0)
4  $n_x \leftarrow \lceil \sqrt[4]{size[X]} \rceil$
5  $X0_{sort} \leftarrow$ sort $X$ by 0 dimension
6  $Bounds0 \leftarrow$ FINDBOUNDARIES($X0_{sort}$, dimension 0)
7  $X1 \leftarrow$ COLLECTDATA($Bounds0$, $X0_{sort}$)
8  $X1_{sort} \leftarrow sort[X1]$
9  $Bounds1 \leftarrow$ FINDBOUNDARIES($X1_{sort}$, dimension 1)
10 $D_y \leftarrow$ BINPACK($Y$, $Bounds0$, $Bounds1$)
11 $MaxEntropy \leftarrow n_x * log(\sqrt{size[X]})$
12 for $i \leftarrow 0$ to $n_x$
13    do for $j \leftarrow 0$ to $n_x$
14       do $Entropy \leftarrow Entropy - D_y[i][j] * log(D_y[i][j]/size[Y])$
15 return($MaxEntropy$, $Entropy$)

*FIG. 4*

$\Omega_{cxd}(X, Y)$
1  $N_{min} \leftarrow 2$
2  if $size[X] < N_{min}$ or $size[Y] < N_{min}$
3      then return (0,0)
4  $n_x \leftarrow size[X]$
5  $X0_{sort} \leftarrow$ sort $X$ by 0 dimension
6  for each key $k$ of $X0_{sort}$
7      do $XD[X0_{sort}[k][1]] \leftarrow XD[X0_{sort}[k][1]] + 1$
8  $n_m \leftarrow size[XD]$
9  $\alpha \leftarrow log(n_m)/log(n_x)$
10 $n_c \leftarrow n_x^{\alpha}$
11 if $n_c < N_{min}$ or $n_m < N_{min}$
12     then return(0,0)
13 $Bounds0 \leftarrow$ FINDBOUNDARIES($X0_{sort}$, dimension 0)
14 $MaxEntropy \leftarrow n_x * log(n_x^{\alpha} * n_m)$
15 $D_y \leftarrow$ BINPACK($Y$, $Bounds0$)
16 for $i \leftarrow 0$ to $n_x$
17     do for each key $j$ of $D_y[i]$
18         do $Entropy \leftarrow Entropy - D_y[i][j] * log(D_y[i][j]/size[Y])$
19 return($MaxEntropy$, $Entropy$)

FIG. 5

$\Omega_{d \times d}(X, Y)$
1   $N_{min} \leftarrow 4$
2   if $size[X] < N_{min}$ or $size[Y] < N_{min}$
3      then return (0,0)
4   for each key $k \in X$
5      do $D_{x1}[X[k][0]] \leftarrow D_{x1}[X[k][0]] + 1$
6         $D_{x2}[X[k][1]] \leftarrow D_{x2}[X[k][1]] + 1$
7   $n_m \leftarrow size[D_{x1}] * size[D_{x2}]$
8   $MaxEntropy \leftarrow size[X] * log(n_m)$
9   for each key $k \in Y$
10     do $D_y["Y[k][0]Y[k][1]"] \leftarrow D_y["Y[k][0]Y[k][1]"] + 1$
11   $Entropy \leftarrow 0$
12   for each key $k$ of $D_y$
13     do $Entropy \leftarrow Entropy - D_y[k] * log(D_y[k]/size[Y])$
14   return($MaxEntropy, Entropy$)

*FIG. 6*

| Change | Semaphore | Odds favoring problem | Potential of problem (Maximum credible assessment) |
|---|---|---|---|
| Normal | ◆ | 3 to 1 | Little potential of problem |
| Outer Normal | ◇ | 6 to 1 | Substantial potential of problem |
| Borderline | ◧ | 20 to 1 | Strong potential of problem |
| Abnormal | ◨ | >20 to 1 | Decisive potential of problem |

*FIG. 7*

SYSTEM AND METHOD FOR ASSURING THE INTEGRITY OF DATA USED TO EVALUATE FINANCIAL RISK OR EXPOSURE

This application claims priority to co-pending provisional application entitled "CONTENT ANALYSIS" having U.S. Ser. No. 60/147,487 filed Aug. 9, 1999.

FIELD OF THE INVENTION

The present invention relates to a system and method for measuring the financial risks associated with trading portfolios. Moreover, the present invention relates to a system and method for assuring the integrity and validity of data used to evaluate financial risk or exposure.

BACKGROUND OF THE INVENTION

As companies and financial institutions grow more dependent on the global economy, the volatility of currency exchange rates, interest rates, and market fluctuations creates significant risks. Failure to properly quantify and manage risk can result in disasters such as the failure of Barings ING. To help manage risks, companies can trade derivative instruments to selectively transfer risk to other parties in exchange for sufficient consideration.

A derivative is a security that derives its value from another underlying security. Derivatives also serve as risk-shifting devices. Initially, they were used to reduce exposure to changes in independent factors such as foreign exchange rates and interest rates. More recently, derivatives have been used to segregate categories of investment risk that may appeal to different investment strategies used by mutual fund managers, corporate treasurers or pension fund administrators. These investment managers may decide that it is more beneficial to assume a specific risk characteristic of a security.

Derivative markets play an increasingly important role in contemporary financial markets, primarily through risk management. Derivative securities provide a mechanism through which investors, corporations, and countries can effectively hedge themselves against financial risks. Hedging financial risks is similar to purchasing insurance; hedging provides insurance against the adverse effect of variables over which businesses or countries have no control.

Many times, entities such as corporations enter into transactions that are based on a floating rate, interest, or currency. In order to hedge the volatility of these securities, the entity will enter into another deal with a financial institution that will take the risk from them, at a cost, by providing a fixed rate. Both the interest rate and foreign exchange rate derivatives lock in a fixed rate/price for the particular transaction one holds.

For example, Alan loans Bob $100 dollars on a floating interest rate. The rate is currently at 7%. Bob calls his bank and says, "I am afraid that interest rates will rise. Let us say I pay you 7% and you pay my loan to Alan at the current floating rate." If rates go down, the bank makes the money on the spread (the difference between the 7% float rate and the new lower rate) and Bob is borrowing at a higher rate. If rates rise however, then the bank loses money and Bob is borrowing at a lower rate. Banks usually charge a risk/service fee, in addition, to compensate for the additional risk.

Consider another example: If ABC, an American company, expects payment for a shipment of goods in British Pound Sterling, it may enter into a derivative contract with Bank A to reduce the risk that the exchange rate with the U.S. Dollar will be more unfavorable at the time the bill is due and paid. Under the derivative instrument, Bank A is obligated to pay ABC the amount due at the exchange rate in effect when the derivative contract was executed. By using a derivative product, ABC has shifted the risk of exchange rate movement to Bank A.

The financial markets increasingly have become subject to greater "swings" in interest rate movements than in past decades. As a result, financial derivatives have also appealed to corporate treasurers who wish to take advantage of favorable interest rates in the management of corporate debt without the expense of issuing new debt securities. For example, if a corporation has issued long term debt with an interest rate of 7 percent and current interest rates are 5 percent, the corporate treasurer may choose to exchange (i.e., swap) interest rate payments on the long term debt for a floating interest rate, without disturbing the underlying principal amount of the debt itself.

In order to manage risk, financial institutions have implemented quantitative applications to measure the financial risks of trades. Calculating the risks associated with complex derivative contracts can be very difficult, requiring estimates of interest rates, exchange rates, and market prices at the maturity date, which may be twenty to thirty years in the future. To make estimates of risk, various statistical and probabilistic techniques are used. These systems, called Pre-Settlement Exposure Servers (PSE Servers) are commonly known in the art.

PSE Servers simulate market conditions over the life of the derivative contracts to determine the exposure profile representing the worst case scenario within a 97.7% confidence interval, or approximately two standard deviations. This exposure profile is calculated to give current estimates of future liabilities. As market conditions fluctuate from day to day or intra-day, the calculated exposure profile changes; however, these changes are not always due to market fluctuations, they are sometimes due to errors in the input data.

In the past, input data errors have been manually detected by users; however, since the quantity of input data is now so large, it is impossible for users to detect and correct all of the errors. Users are most likely to detect errors in the input data that cause a significant change in the exposure profile.

The present invention seeks to automatically detect errors in input data to the PSE Server using an information theory technique known as Content Analysis. Content Analysis, based on information theory, attempts to look for sweeping changes or statistically significant trends in data suggestive of error. If statistically significant changes are detected, users can be alerted that one or more errors in the input data is likely. This prevents invalid data from skewing the resulting exposure profiles, providing more accurate estimations of possible exposure.

SUMMARY OF THE INVENTION

In accordance with the invention, a method and system are provided for detecting abnormalities in input data to a financial risk management system. The method includes receiving a set of input data to a financial risk management system; receiving one or more historical values, each historical value representing a calculated content from a previous set of input data; and calculating the likelihood that changes to the set of input data are the result of one or more errors.

In further aspects of the invention, the input data includes data feeds from one or more data processing system as well as calculated data from a financial risk management system. In one embodiment of the invention, a result is determined based on the calculated likelihood that changes to the set of input data are the result of one or more errors. The result is then displayed. In one embodiment of the present invention, the result is displayed to users as an icon indicative of the degree of likelihood that changes to the set of input data are the result of one or more errors.

In yet a further aspect of invention, the likelihood that changes to the set of input data are the result of one or more errors is calculated by determining the information content of the input data, and performing a statistical analysis of the calculated information content relative to historical values to determine the likelihood that changes to the input data are the result of one or more errors. The information content of input data can be calculated by determining the Shannon entropy of the data and the statistical analysis can be performed using non-parametric statistics, parametric statistics, or Bayesian statistics.

BRIEF DESCRIPTION OF THE DRAWINGS

Having thus briefly described the invention, the same will become better understood from the following detailed discussion, taken in conjunction with the drawings where:

FIG. 2 is pseudocode describing the calculation of $\Omega$ for discrete data inputs according to an embodiment of the present invention;

FIG. 3 is pseudocode describing the calculation of $\Omega$ for continuous data inputs according to one embodiment of the present invention;

FIG. 4 is pseudocode describing the calculation of $\Omega$ for continuous by continuous data inputs according to one embodiment of the present invention;

FIG. 5 is pseudocode describing the calculation of $\Omega$ for continuous by discrete data inputs according to one embodiment of the present invention;

FIG. 6 is pseudocode describing the calculation of $\Omega$ for discrete by discrete data inputs according to one embodiment of the present invention;

FIG. 7 is a table depicting semaphores representing the likelihood of errors according to an embodiment of the present invention;

DETAILED DESCRIPTION

Figure 1:
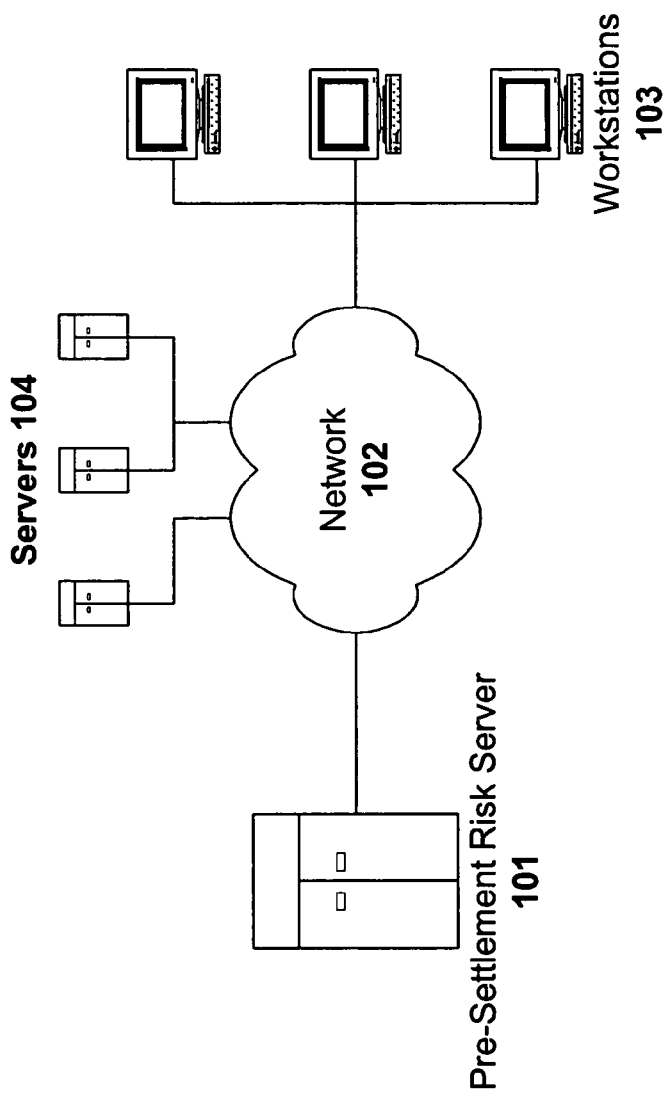
FIG. 1 is a network diagram showing a PSE Server according to one embodiment of the present invention.

In the late 1940s, Claude Shannon, an American engineer working for Bell Telephone Labs, made a monumental discovery—the connection between physical entropy and information entropy. Shannon understood that the amount of "information" in a message is its entropy. Entropy is exactly the amount of information measured in bits needed to send a message over the telephone wire or, for that matter, any other channel including the depths of space. At maximum entropy, a message is totally incomprehensible, being random gibberish, containing no useful information.

The present invention uses a method we call Content Analysis to determine if changes in financial information are likely the result of errors. Content Analysis uses the Shannon measure of information content; however, instead of working with messages, Content Analysis works with financial information. Much financial information is far from equilibrium, meaning the data is highly non-normally distributed. Thus this condition, while not readily suitable for ordinary statistics, is ideal for entropy analysis. We call our measurement of content not entropy but omega ($\Omega$).

Content Analysis consists of two parts: (1) first, trading information is thermalized by converting it to Shannon entropy; and (2) then, the resulting data is processed further by applying statistical analysis to determine if changes are likely caused by errors in input data. In the preferred embodiment of the present invention, the thermalized data is processed using non-parametric resampling statistics on changes in content. Given a change in content, non-parametric resampling statistics provide a mechanism to deduce the probability of a Type I Error at a given statistical confidence level.

Additional embodiments of the present invention use other statistical methods commonly known in the art. Any method that can determine whether the thermalized change is likely the result of one or more errors instead of expected fluctuations in market conditions or changed positions can be used to perform Content Analysis. For example, alternative statistics such as parametric or Bayesian statistics can be used. The preferred embodiment of the present invention uses resampling statistics because they are robust and they are easy to use and implement. The only potential drawback to resampling statistics is speed; though in practice modern computer processors are fast enough to provide adequate performance.

Content Analysis determines the confidence level that a change in input trading data is caused by errors. This confidence level is then presented on a logarithmic scale of odds ratios which we call the maximum credible assessment. Our assessment scale is attributed to Harold Jefferys, a British geophysicist and pioneering statistician of the Bayesian school of the 1930s.

There are several applications and benefits to looking at trading information in this way. One advantage is that the description of complex financial data, both trading contracts and spot market factors, is standardized in terms of actual content. Thus, different quantities can be compared and discussed meaningfully using a more abstract but measurable quantity, although representing disparate information. Once in standard form, statistics, numerical analysis, etc. can be run against the data.

Thus, we are mainly interested in $\Delta\Omega$ (i.e., changes in information content). The difference is analogous to measuring the temperature of a heat bath versus measuring changes in temperature of the heat bath. Given $\Delta\Omega$, we can compile historical data and look for unexpected fluctuations as a plausible indication that the data integrity has been compromised. Now that Content Analysis has been described generally, we now turn to a detailed description of an implementation according to a preferred embodiment of the present invention.

FIG. 1 is a network diagram showing a PSE Server 101 attached to a computer network 102. The PSE Server 101 uses techniques commonly known in the art to determine an exposure profile representing the worst case scenario within a two standard deviation confidence interval (i.e., 97.7% confidence). In the preferred embodiment, the data calculations made by the PSE Server 101 are stored on the computer system as a file that can be accessed by a software application according to the present invention.

The PSE Server 101 collects data from various sources regarding portfolios of derivative instruments. Using the collected data, the PSE Server 101 derives and or receives various measurements of exposure or risk such as the Current Mark to Market ("CMTM") and the Maximum Likely Increase in Value ("MLIV"). The CMTM is the current market value of a portfolio of financial instruments and the MLIV is the maximum likely increase in value of a trade.

One embodiment of the present invention uses a data file containing the results from conventional calculations performed by the PSE Server 101 to perform Content Analysis and thus determine whether changes in the exposure profile are likely caused by some error in the input data. Before describing how the present invention uses Content Analysis, we must first describe how the content of various kinds of information is calculated.

Table 1 gives the mathematical formulae for calculating $\Omega$ for each object type. An object is just a measurable quantity of information in the Server. For example, product codes, zero coupon discount curves, etc. The total number of objects in the macrostate (the universe of objects) is always N and each microstate (a sub-universe) has $N_i$ objects. Objects may be discrete (e.g., product codes) or continuous (e.g., CMTMs). The number of microstates for discrete objects is M or $M_1$ and $M_2$. The number of microstates for continuous objects is a function of the number of dimensions and the object type(s). We choose $N_i$ in such a way so that the search complexity is reasonable. This number $N_i$ is justified by an empirical analysis of the current size of the global book for the largest counterparty and the expected growth over the foreseeable future.

Figure 9:
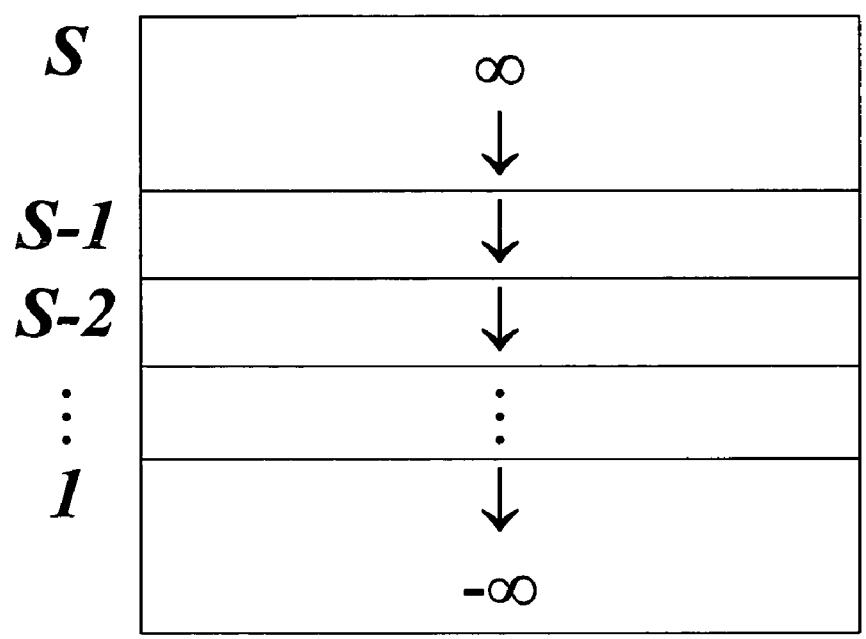
FIG. 9 is a diagram describing the handling of boundary conditions while performing Content Analysis on continuous input data according to one embodiment of the present invention.
Figure 10:
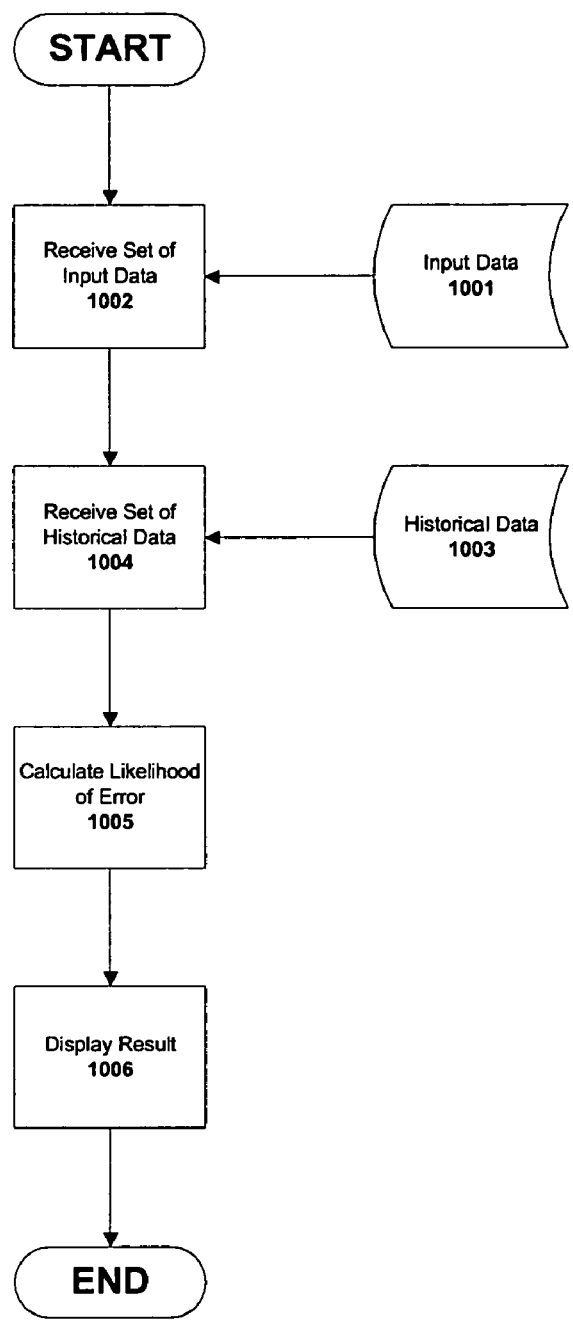
FIG. 10 is a flow chart describing a method for identifying input errors in input data according to an embodiment of the present invention.

Thus, for the continuous case, we choose $N_i = \lceil \sqrt{N} \rceil$. For the continuous×continuous case, we choose $N_i = \lceil \sqrt[4]{N} \rceil$. For the continuous×discrete case, we have $\alpha = \log M / \log N$ so that $N_i = \lceil N^\alpha \rceil$ where $0 < \alpha \leq 1$. In the continuous cases, boundary conditions are handled. This is shown for one dimension in FIG. 9.

TABLE 1

| Type(s) | $\Omega$ | $\Omega_{max}$ | $N_{min}$ |
|---|---|---|---|
| discrete | $\sum_{i}^{M} N_i \log N/N_i$ | $N \log M$ | 2 |
| discrete × discrete | $\sum_{i}^{M_1} \sum_{j}^{M_2} N_{i,j} \log N/N_{i,j}$ | $N \log M_1 M_2$ | 4 |
| continuous | $\sum_{i}^{\lceil \sqrt{N} \rceil} N_i \log N/N_i$ | $N \log \sqrt{N}$ | 4 |
| continuous × continuous | $\sum_{i}^{\lceil \sqrt[4]{N} \rceil} \sum_{j}^{\lceil \sqrt[4]{N} \rceil} N_{i,j} \log N/N_{i,j}$ | $N \log \sqrt{N}$ | 16 |
| continuous × discrete | $\sum_{i}^{\lceil N^\alpha \rceil} \sum_{j}^{\lceil M \rceil} N_{i,j} \log N/N_{i,j}$ | $N \log N^\alpha M$ | $N^\alpha M = 2$ |

Table 1 describes how content analysis is performed using five modes of input data: discrete, discrete×discrete, continuous, continuous×continuous, and continuous×discrete. FIGS. 2-6 describe a method for computing $\Omega$ for each mode of input data using pseudocode. One skilled in the art will appreciate that each of these methods described by FIGS. 2-6 can be easily implemented in most modern computer languages. In the preferred embodiment of the present invention, a Perl script is used to read the input data from the PSE Server 101 and to perform Content Analysis.

Figure 8:
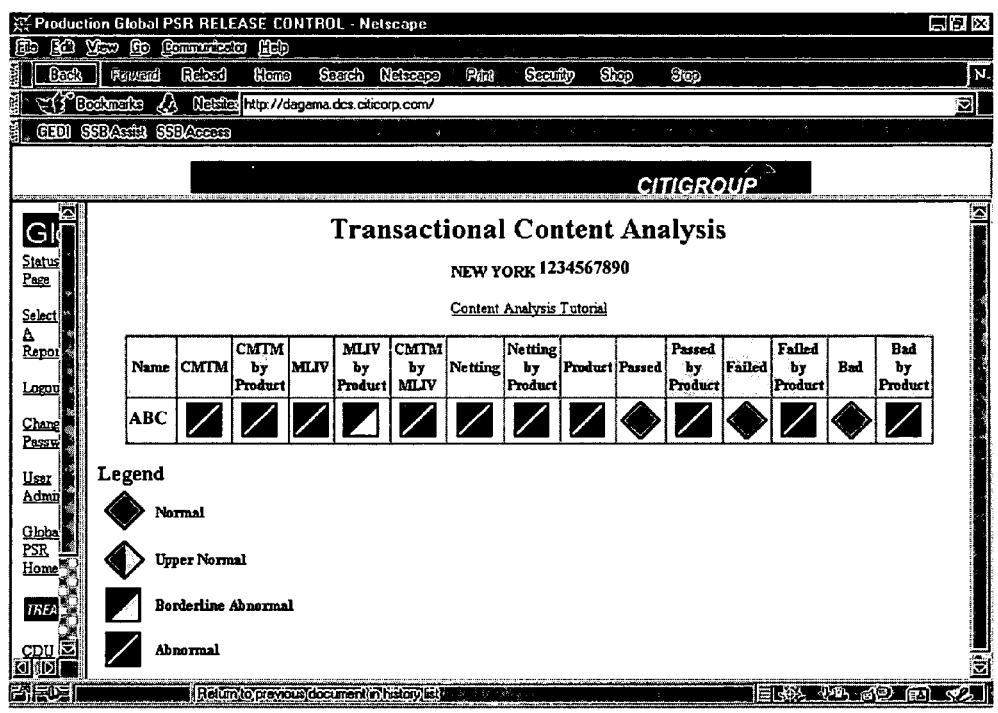
FIG. 8 is a screenshot depicting the results of applying Content Analysis to input data according to an embodiment of the present invention.

Using these techniques to compute the information content of the input data, the following reports described below in Table 2 can be generated with the data from the PSE Server: (1) CMTM; (2) CMTM×Product; (3) MLIV; (4) MLIV×Product; (5) Fails; (6) Fails×Product; (7) Bad; (8) Bad×Product; (9) Netting; (10) Products; (11) Netting Product; (12) CMTM×MLIV; (13) Passes; and (14) Passes×Product, where CMTM is the "Current Mark to Market" and MLIV is the "Most Likely Increase in Value". In one embodiment of the present invention, these fourteen Content Analysis reports are displayed in a grid as shown in FIG. 8. The report grid is designed to provide a comprehensive picture of how content across counter-parties is changing. Thus, if there is a detectable trend, it should be fairly easy to spot the pattern.

TABLE 2

| Feature Content | Comment |
|---|---|
| CMTM | This analysis measures changes in CMTM over all trades for the counter-party. The analysis holds potential to reveal content shifts in the portfolio as a hold. |
| CMTM by Product | This analysis measures changes in CMTM over all trades by product for the counter-party. The analysis holds potential to reveal content shifts that are isolated to a product group. |
| MLIV | This analysis measures changes in MLIV over all trades, pass or fail, for the counter-party. The analysis holds potential to reveal content shifts in the portfolio. |
| MLIV by Product | This analysis measures changes in MLIV over all trades by product for the counter-party. The analysis holds potential to reveal content shifts that are isolated to a product group. |
| CMTM by MLIV | This analysis measures changes in CMTM over all trades by MLIV for the counter-party. It may perhaps be a little difficult to visualize this in two dimension but imagine a scatter plot of CMTM and MLIV. The analysis holds potential to reveal content shifts that are isolated to one or more areas of the scatter. |
| Netting | This analysis measures changes in the netting structure over all trades for the counter-party. The analysis holds potential to reveal content shifts in the netting of a portfolio that is not detectable by just looking at the total netting count. |
| Netting by Product | This analysis measures changes in the netting structure over all trades by netting agreement for the counter-party. The visualization problem here is the same as CMTM and MLIV: namely, try to imagine a scatter plot of netting agreements and products. The analysis hold potential to reveal content shifts that are isolated to one or more areas of the scatter. |
| Product | This analysis measures changes in products over all trades for the counter-party. The analysis holds potential to reveal content shifts in the portfolio of products. |
| Passed | This analysis measures changes in pass counts over all trades for the counter-party. The analysis holds potential to reveal pass count shifts over all trades in the portfolio. |
| Passed by Product | This analysis is very similar the analysis for products; here the content is filtered only for products that pass the tolerance test. |
| Failed | This analysis measures changes in fail counts over all trades for the counter-party. The analysis holds potential to reveal fail count shifts over all trades in the portfolio. |
| Failed by Product | This analysis is very similar the analysis for products; here the content is filtered only for products that fail the tolerance test. The analysis holds potential to reveal content shifts isolated to failed products. |

TABLE 2-continued

| Feature Content | Comment |
| --- | --- |
| Bad | This analysis measures changes in bad counts over all trades for the counter-party. The analysis holds potential to reveal bad count shifts over all trades in the portfolio. |
| Bad by Product | This analysis is very similar the analysis for products; here the content is filtered to capture bad products. The analysis holds potential to reveal contents shifts isolated to bad products. |

The following table describes some of the reports that can be generated using Content Analysis as well as whether the feature measured is continuous, discrete, or a combination of the two. These reports are displayed in a graphical user interface such as that shown in FIG. 8. using the semaphores. A user can use the report displayed by the graphical user interface to determine if there are errors in the data that need attention.

TABLE 3

| Feature | Discrete or Continuous | Basic or Complex |
| --- | --- | --- |
| Net agreements | Discrete | Basic |
| Products | Discrete | Basic |
| Schedule records | Discrete | Basic |
| Time to maturity | Continuous | Basic |
| CMTMs | Continuous | Basic |
| MLIVs | Continuous | Basic |
| Net agreements × Products | Discrete-Discrete | Complex |
| Net agreements × CMTMs | Discrete-Continuous | Complex |
| CMTM × MLIV | Continuous-Continuous | Complex |

The present invention uses these reports to determine where human intervention is likely to be necessary. Thus, users can be alerted to the possibility of bad data and shown the input data that has substantially different information content than historical runs. This information can be displayed in a graphical user interface using the symbols shown in FIG. 7.

The goal of Content Analysis is to put changes in content, not content per se, into perspective. The idea of Content Analysis rests on a premise so obvious it is often overlooked: namely, that data feeds are in a constant state of flux. The problem, however, is that sometimes manual inspection fails to distinguish between "normal" changes we might expect from ordinary business/systems operations versus data errors caused by those operations, including human faults, system failures, and whatnot.

Content Analysis assesses changes in content using a simple odds scale called maximum credible assessments. The maximum credible assessment gives the most we could say in practice about content changes which we categorize as normal, outer normal, borderline, and abnormal changes. The maximum credible assessment criteria are summarized in Table 4 below. These criteria are arbitrary; one of ordinary skill in the art will appreciate that these values can be modified without departing from the spirit of the present invention. Additional embodiments of the present invention can include varying numbers of change categories. For example, a three category system can be provided including the following change categories: Normal, Borderline, and Abnormal.

TABLE 4

| Change | Odds favoring problem | Potential of problem (Maximum credible assessment) |
| --- | --- | --- |
| Normal | 3 to 1 | Little potential of problem |
| Outer Normal | 6 to 1 | Substantial potential of problem |
| Borderline | 20 to 1 | Strong potential of problem |
| Abnormal | >20 to 1 | Decisive potential of problem |

As shown in Table 4, changes to trading data is likely. Since some change is expected and not necessarily the result of errors, we select ranges of odds that are indicative of errors to the input data. In other applications, input data may be more regular than in the present embodiment. If data is more regular, then smaller changes in content may be more likely caused by errors than that shown in Table 4.

In other words, the maximum credible assessment is only a statement of plausibility, not actuality. The maximum credible assessments have been designed so that we really only have to worry about two kinds of changes: borderline and abnormal. These represent "big" or "near-big" changes in content.

Content Analysis measures changes in content relative to expectations based on recent history. This is a loaded statement, the importance of which cannot be emphasized enough. Essentially the change categories listed in Table 4 are not static, predefined ideals. They are measurements relative to our expectations based on historic or prior data which are always changing as feeds change. The likelihood that a change is abnormal is a measure of the change relative to the prior history of data feed. Content Analysis is not only measuring changes in the content or Q of input data, but it also measures the likelihood that the changes are abnormal. Thus, the statistics of Content Analysis are regularly changing based on historic data feeds. Consequently what is a normal change in content today might not be normal next week depending on recent history.

Recent history is essentially a sliding window of feeds which we use to compute the statistics of Content Analysis as far as expectations go. The size of the sliding window itself is two to three weeks depending on a couple of factors.

Factor one concerns how feeds have come into the Server. If feeds have been missed, i.e., not sent to the Server, the sliding window of recent history shrinks one day. If feeds are not sent for two days in a row, recent history shrinks by two days and so on.

Factor two concerns how feeds have been released. If an entire feed is canceled, we have the same situation as Factor One. If, however, a counter-party is canceled, we have a different situation in which the window remains the same size but the content is slightly skewed for the counter-party. This occurs because performing release-by-counter-party makes the system use the last known data believed to be good for the current run. Inside the Server this means the feed for the counter-party is duplicated (or triplicated if a counter-party is canceled twice in a row) which tends to distort the content.

Distorted content caused by a shrinking window of historical data or by duplicated or triplicated data, tends to make Content Analysis more sensitive to content changes. A change that would have been normal otherwise, may move in the outer normal direction as repeated historical data amplifies any changes that may occur.

Fortunately, resampling statistics are robust enough to gracefully handle these problems. Moreover, the window distortions eventually correct themselves as old feeds are removed from the system. The sliding window reverts to its normal size and content distortions are minimized.

Embodiments of the present invention have now been generally described in a non-limiting manner. It will be appreciated that these examples are merely illustrative of the present invention, which is defined by the following claims. Many variations and modifications will be apparent to those of ordinary skill in the art.

What is claimed is:

1. storing, by a server, one or more values of historical data wherein the historical data comprises at least one measurement of an investment;
   receiving, by the server, via a computer network, financial input data for the investment from one or more data processing systems;
   determining, by the server, a measurement for the investment based on the financial input data;
   calculating, by the server, information content of the financial input data using continuous, discrete and a combination of continuous and discrete modes of the input data;
   determining, by the server, a change in the information content of the financial input data as compared to information content based on the historical data;
   determining, by the server, a confidence level based on the change in the information content of the financial input data as compared to the information content based on the historical data;
   assessing, by the server, whether the change was caused by an error in the financial input data by categorizing the confidence level; and
   generating, by the server, a report based on the categorized confidence level.

2. The method according to claim 1, wherein calculating the information content of the financial input data comprises processing non-parametric resampling statistics on changes in the information content in the financial input data.

3. The method according to claim 1, further comprising calculating the information content of the historical data by processing non-parametric resampling statistics on changes in the information content in the historical data.

4. The method according to claim 1, wherein calculating the information content of the financial input data comprises processing parametric statistics on changes in the information content in the financial input data.

5. The method according to claim 1, further comprising calculating the information content of the historical data by processing parametric statistics on changes in the information content in the historical data.

6. The method according to claim 1, wherein calculating the information content of the financial input data comprises processing Bayesian statistics on changes in the information content in the financial input data.

7. The method according to claim 1, further comprising calculating the information content of the historical data by processing Bayesian statistics on changes in the information content in the historical data.

8. The method according to claim 1, further comprising presenting the confidence level on a logarithmic scale of odds ratios.

9. The method according to claim 1, wherein determining the measurement for the investment based on the financial input data comprises deriving a mark to market or maximum likely increase in value.

10. The method according to claim 1, wherein the report comprises a symbol representing a possibility of an error in the financial input data.

* * * * *

UNITED STATES PATENT AND TRADEMARK OFFICE
CERTIFICATE OF CORRECTION

| | | |
|---|---|---|
| PATENT NO. | : 8,266,025 B1 | Page 1 of 1 |
| APPLICATION NO. | : 09/634755 | |
| DATED | : September 11, 2012 | |
| INVENTOR(S) | : Coleman et al. | |

It is certified that error appears in the above-identified patent and that said Letters Patent is hereby corrected as shown below:

In the Claims

Column 9, line 10, Claim 1:

Please insert --A computer-implemented method for determining whether changes in data are the result of an error, the method comprising:--.

Signed and Sealed this
Eighteenth Day of November, 2014

Michelle K. Lee
*Deputy Director of the United States Patent and Trademark Office*